May 26, 1931.   F. C. GARRISON   1,807,063
PIVOT HINGE
Filed April 3, 1929
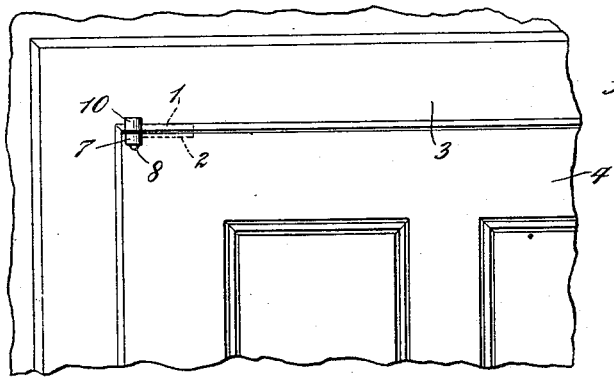
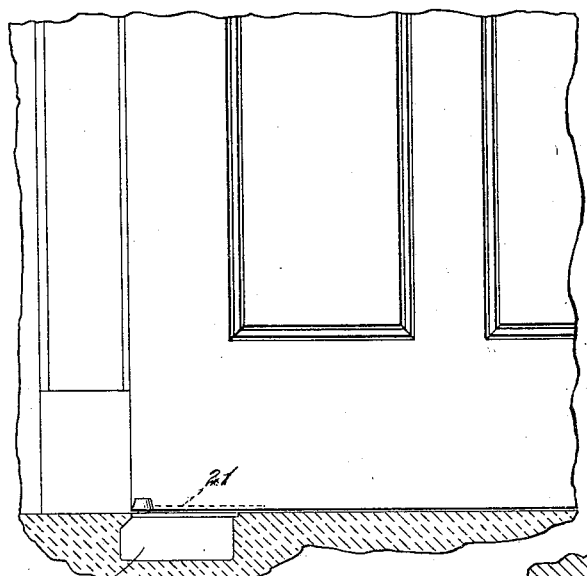
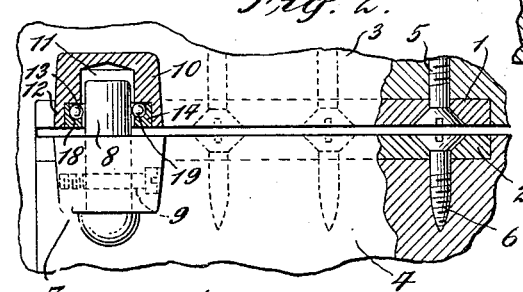
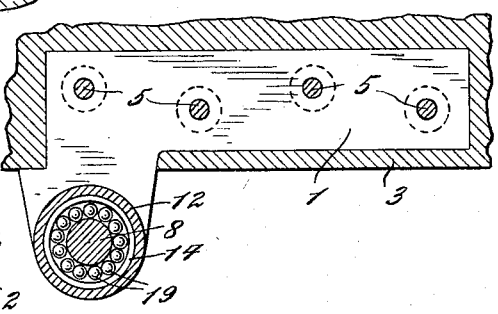
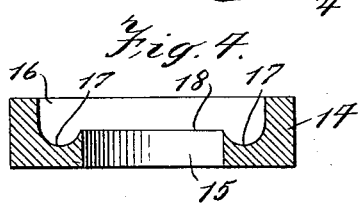
INVENTOR
Forrest C. Garrison
BY
ATTORNEY Patented May 26, 1931

1,807,063

UNITED STATES PATENT OFFICE

FORREST C. GARRISON, OF EVANSTON, ILLINOIS, ASSIGNOR TO THE OSCAR C. RIXSON COMPANY, A CORPORATION OF ILLINOIS

PIVOT HINGE

Application filed April 3, 1929. Serial No. 352,149.

This invention relates particularly to pivot hinges of the type used commonly upon such swinging closures as doors and the like and more particularly at the top of the door adjacent to the lintel. Heretofore extremely careful and accurate workmanship in effecting installations has been necessary in the setting of these hinges so as to have the axes of the respective knuckles in accurate alignment. Also, even if accurately set to begin with in making the installation, in many instances parts of the building will subsequently settle unequally in such a manner as to produce axial misalignment of the two cooperating knuckles of the hinge, so that thereby the pivot pin which projects from one of these knuckles will bind in its bearing in the other knuckle, resulting in undesirable friction and an undue amount of wear.

An object of this invention is to provide a pivot hinge in which the axis of the pivot pin and the axis of its bearing may be to a considerable extent in angular misalignment without interfering with the free swinging operation, together with a minimum of friction and without the production of any detrimental results, and which at the same time provides for a longitudinal axial movement of the pivot pin in its bearing, so that thereby the door is free to expand or to shrink. Thus no particularly great skill and care will be required in the making of an installation, and similarily parts of the building may settle unequally without interfering with the operation of this improved hinge.

In carrying out the invention, a slightly loose bearing ring is provided for the cylindrical pivot pin around a single circular or circumferential line thereon which provides for the relative rocking or angular axial misalignment of the axes of the pivot pin and its bearing, as well as for relative sliding movement axially on the pivot pin. This bearing ring for the cylindrical pivot pin is rounded away from its circular bearing line on the pivot pin and this loose rounded bearing is formed by means of a complete circular series of anti-friction bearing balls of relatively small size as compared with the diameter of the cylindrical pivot pin which bears directly on these balls and thus forms an inner ball race, the outer ball race being provided in the cooperating hinge knuckle in a pin-receiving opening therein which is of sufficiently larger bore or diameter than the pivot pin to provide for the above noted rocking or angular movement of the pivot pin relatively to its bearing. That is to say, there is a sufficient clearance or looseness between the bearing balls and the pivot pin, for this purpose. This outer ball race is formed by means of a ball-carrying cup which is firmly seated in a recess in the end of the hinge knuckle and which has provided thereon adjacent to the end of the knuckle an annular ball-retaining lip which cooperates with an annular shoulder formed in the pin-receiving bore of the knuckle at the bottom of the cup-receiving recess in the end of the knuckle. The invention further includes therein various features of construction and combinations of parts, as will appear from the following description.

One embodiment of the invention which has been illustrated in the accompanying drawings will now be described and thereafter the invention will be pointed out in claims, reference now being had to the drawings, in which:

Fig. 1 is an elevation of a mounted door with parts broken away, showing a top hinge in which the invention is embodied;

Fig. 2 is a similar enlarged view of the top of the door, partly in vertical section at the end of the hinge leaves and with the upper hinge knuckle in central or axial vertical section;

Fig. 3 is a similarly enlarged horizontal section just above the upper hinge leaf and through the bearing provided in its knuckle, together with the pivot pin carried by the knuckle of the lower leaf on the door;

Fig. 4 is a further enlarged central vertical section of the ball-carrying cup per se, similar to Fig. 2; and Fig. 5 is a view similar to Fig. 2 of the hinge alone illustrating to an extreme extent one example of angular axial misalignment provided for by the invention.

In the embodiment and installation of the invention shown in the drawings, the improved hinge has a pair of similar usual flat L-shaped leaves 1 and 2 extending horizontally in the same direction parallel to each other in suitably spaced relation, the upper leaf 1 being a lintel leaf and the lower leaf 2 being a door leaf. The lintel leaf 1 is mortised into the head jamb or lintel 3 in the usual way with its L-shaped end projecting to the inner side of the door 4, adjacent to its hinged edge, and is secured to the lintel by means of usual screws 5, while the similarly shaped door leaf 2 is mortised into the upper edge or end of the door 4 and similarly secured in place by means of screws 6 with its L-shaped end projecting at the inner side adjacent the hinge edge of the door, so that these two similar hinge leaves 1 and 2 are in vertical alignment when the door 4 is closed, as shown in the drawings.

The forward or outer projecting end of the door leaf 2 at the inner side of the door 4 has formed thereon in one piece therewith a hinge knuckle 7 which extends downward from the upper side of this leaf and projects for some distance below the lower side thereof. This door leaf knuckle 7 is provided with an axial bore extending through it which snugly but removably receives a cylindrical pivot pin 8, shown as provided with a limiting head at its lower end and which projects for some distance upward above the top of the knuckle 7 there to form a cylindrical journal or pivot for the hinge. This pivot pin 8 is rigidly supported in the knuckle 7 and is held in place therein by means of a screw 9 which passes through the knuckle 7 and the pivot pin 8, having at its end screw-threaded engagement with the knuckle and shown as having its head countersunk into the knuckle. This hinge knuckle assembly, including the door knuckle 7, its pivot pin 8 and pin-retaining screw 9, is of substantially a usual construction heretofore employed in the type of hinge in which the invention is shown as embodied.

The forwardly or outwardly projecting end of the lintel leaf 1 has formed thereon in one piece therewith a bearing-providing knuckle 10 which extends upward from the lower face of this leaf and projects a suitable distance above its upper face. A bearing in accordance with the present invention is provided in this knuckle 10 for the upwardly projecting free end portion of the cylindrical pivot pin 8. This knuckle 10 has provided therein a cylindrical axial bore 11 which is of substantially larger diameter than the diameter of the pivot pin 8, the reason for which will presently appear. In the particular construction shown, this bore 11 does not extend quite through to the upper end of the knuckle 10 so that this knuckle is thus in the form of a cap which, while not essential to the carrying out of the invention, provides somewhat greater strength as well as a better finish. The lower open end of the axial bore 11 is considerably enlarged to provide a concentric annular recess which is circumferentially formed by a cylindrical skirt portion 12 on the knuckle 10, the upper or inner end of this recess being formed by a horizontally annular shoulder 13 surrounding the bore 11 at right angles thereto, this shoulder 13 being shown as disposed in the plane of the upper face of the lintel leaf 1.

An outwardly circular annular cup member 14 is of a diameter and of a thickness at its periphery to fill the above noted recess. This cup member 14 has a tight fit within the circumferential wall 12 of this recess, being forced or pressed into place therein so that it is thereby securely anchored in the knuckle 10, although this fit need not be so tight but that the cup member could be forcibly withdrawn should that be desired in effecting its renewal. In accordance with the invention, this annular cup member 14 is so shaped as to cooperate with the knuckle shoulder 13 to form therewith an outer ball race and also for retaining bearing balls therein. This annular cup member 14 has plane upper and lower parallel faces, the upper face of which abuts against the end of the recess formed by the shoulder 13 while the lower face of this cup member is flush with the lower end of the knuckle 10 formed by its cup-receiving skirt portion 12. Extending inwardly or upwardly from this lower plane face the cup member 14 has therein a cylindrical bore 15 which may be substantially the same but which is shown as of slightly smaller diameter than the upper reduced portion of the shoulder-forming bore 11.

The upper side of this cup member 14 has therein an enlarged cylindrical wall-forming recess 16 which extends downward from the upper plane annular face of this cup member which, as above noted and as is shown in the drawings, is fitted against the outer or peripheral part of the shoulder 13. Between the upper edge of its bore 15 and the downward termination of its inner cylindrical wall 16 the cup member 14 is provided with an annular bottom 17 which is transversely concavely curved to form an annular trough which gradually merges outwardly and upwardly into the inner vertical cylindrical wall 16, the transverse curve of this trough bottom 17 being shown as substantially circular, with the upwardly extending inner cylindrical surface 16 as tangential to this transverse circular curve of the trough 17. The inner edge of this annular trough or cup bottom 17 curves upwardly and joins the upper end of the inner bore 15 at an acute angle, thereby forming an upwardly projecting annular lip 18.

A complete annular series of bearing balls 19 are of a size to be loosely contained in and supported by the annular trough-shaped cup bottom 17 without frictional contact with the overlying shoulder 13 within the knuckle 10. Thus a complete outer ball race is formed by this shoulder 13, the enlarged cylindrical bore or circumferential wall 16 and the cup bottom or trough 17. These bearing balls 19 project inwardly into the inner space formed within the knuckle bore 11 and the cup bore 15 there to form an antifriction bearing ring for and directly upon the cylindrical pivot pin 8, which, as indicated in the drawings, has a slightly loose fit within this bearing formed by the inwardly projecting portions of the curved surfaces of the bearing balls 19.

The annular space or opening provided between the inner right angular corner formed by the shoulder 13 with the bore 11 and the edge of the upstanding lip 18 is small enough to prevent the escape of the bearing balls 19 from the ball race in the absence of the pivot pin 8, which when it is present in the bearing as shown in the drawings, itself forms the inner race for these bearing balls 19. Thus this lip 18 on the cup member 14, in cooperation with the shoulder 13 in the knuckle 10, forms a ball retainer. This arrangement results in a compact bearing construction of minimum dimensions. It will be noted that this construction permits the bearing knuckle 10 to be as small in size as the pin-carrying knuckle 7, while also it may be, as shown, of the same shape and appearance.

The retention of the bearing balls 19 within the outer ball race provided in the knuckle 10 provides great convenience in assembling the hinge in making an installation, also for disassembling when desired and similarly for the separate handling of the two hinge leaves 1 and 2, together with the parts respectively carried thereby, in segregated relation or unassembled condition, as will be readily understood. It will be noted that the cross section of one side of the annular cup member 14 is in general substantially of an L shape, as appears in Figs. 2, 4 and 5 at the left, while the inner cup-forming or race-forming recess therein is substantially of a J shape, for instance as shown at the right side in Fig. 4.

The pivot hinge shown and above described is particularly adapted to be utilized as a top hinge or pivot as shown in the drawings, while the bottom hinge or pivot, which supports the weight of the door, may be anything desired so far as the present invention is concerned and, for example, may be simply a lower pivot hinge of suitable construction, which may also embody the present invention, or it may further embody a suitable door closer commonly called a floor check, and such a floor check 20 is indicated in outline elevation in Fig. 1, together with its pivoted operating arm 21 which is carried by the lower end of the door 4, as is indicated in broken lines.

In a perfect installation as originally made and as shown in Figs. 1, 2 and 3 of the drawings, the axis of the pivot pin 8 and the axis of the ring-shaped bearing therefor formed by the rounded projecting surfaces of the bearing balls 19, will be in alignment, as indicated most clearly in Fig. 2. In Fig. 5 there is shown a rather extreme example of axial misalignment between the pivot pin 8 and its bearing formed by the annular series of balls 19, it being noted, however, that the pivot pin 8 is still free to rotate without binding in this bearing and at the same time out of frictional contact with or binding against the bore 11 in the knuckle 10 or the bore 15 in the cup member 14. Such axial misalignment as there shown, although probably not to that extent, could result from the settling of the jamb at the hinged edge of the door without a corresponding settling of the jamb at the free edge of the door, so that thereby the lintel or overhead part of the door frame would carry the upper leaf 1 of the hinge into an angular relation longitudinally thereof relatively to the horizontal plane of rotative movement of the lower or door leaf 2.

Also it will be noted that the pivot pin 8 is free to move and shift longitudinally in its ball bearing regardless of whether or not it may be in axial alignment therewith, so that thereby the door 4 may freely shrink or expand in length without producing any binding of the pivot pin 8 in the bearing knuckle 10 or in the ball bearing provided in this knuckle. It will be noted in this connection that the enlarged bore 11 in this knuckle 10 extends upwardly far enough above the upper end of the pivot pin 8 in its normal position, as shown in Fig. 2 as well as in Fig. 5, to provide enough space for the upward longitudinal shifting of the pivot pin 8, such as might occur with an extension in the length of the door 4 due to its expanding.

It is also to be noted of the invention, in accordance with the emobdiment and installation thereof shown in the drawings, that no special skill and care are required for making an installation, since the axes of the two hinge parts may have more or less angular misalignment or inclination relatively to each other while still providing for the free pivotal operation of the hinge. For instance, if the mortise in the lintel 3 for the leaf 1 should happen to be mode somewhat deeper at its outer than at its inner end, then it will be obvious that a misaligned condition approaching more or less to that shown in Fig. 5 would result. Similarly, for example, either one of the mortises respectively for the lintel leaf 1 or for the door leaf 2 could have its bottom out of a true horizontal plane, or could be angularly inclined in any direction, either longitudinally or transversely, without affecting the free pivotal operation of the two hinge parts relatively to each other.

It is to be understood that the invention is not restricted or limited to the embodiment thereof in the particular type of hinge, nor to the particular installation or use thereof, shown in the drawings. For, example, it should be obvious that this invention may be embodied in various types of hinges, which may be at the top, the bottom, or at an intermediate location, or at all of these places. Also it is obvious that various modifications may be made in the pivot hinge construction shown in the drawings and above particularly described, within the principle and scope of the invention as defined in the appended claims.

I claim:

1. In a hinge of the kind described, a plate adapted to be secured to the underside of a door lintel and having an angular portion projecting laterally therefrom, a hollow boss projecting upwardly from the offset portion and opening downwardly through the plate, a second plate similarly offset and adapted to be secured on the top edge of a door, a tubular boss projecting downwardly from the offset of the second plate, a pin extending up through the boss of the second plate and into the first boss and having a head on its lower end, a retaining screw extending diametrically through the second boss and pin, said pin being of less diameter than the opening in the first boss, and a ball bearing in said boss loosely surrounding the pin.

2. In a hinge of the kind described, a plate adapted to be secured to the under side of a door lintel and having an angular portion projecting laterally therefrom, a boss projecting upwardly from the offset portion and having a cylindrical opening therein enlarged at its lower end, a ball bearing seated in the said enlarged portion of the opening and having a smaller internal diameter than the portion of the cylindrical opening above it, a second plate similarly offset and adapted to be secured to the top edge of a door, a tubular boss projecting downwardly from the offset of the second plate, and a pivot pin removably secured in the latter boss and extending upwardly therefrom through the ball bearing into the first boss, said pin being of slightly less diameter than the internal diameter of the ball bearing.

In witness whereof, I hereunto subscribe my signature.

FORREST C. GARRISON.